(12) United States Patent
Qi et al.

(10) Patent No.: US 11,528,390 B2
(45) Date of Patent: Dec. 13, 2022

(54) MAGNETIC LEVITATION CAMERA APPARATUS AND LIVE VIDEO SYSTEM THEREWITH

(71) Applicant: LINGDONG TECHNOLOGY (BEIJING) CO. LTD, Beijing (CN)

(72) Inventors: Ou Qi, Beijing (CN); Xingyu Lian, Beijing (CN); Jie Tang, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 0 days.

(21) Appl. No.: 17/533,132

(22) Filed: Nov. 23, 2021

(65) Prior Publication Data
US 2022/0086314 A1    Mar. 17, 2022

Related U.S. Application Data

(63) Continuation-in-part of application No. 16/617,492, filed as application No. PCT/CN2018/110959 on Oct. 19, 2018, now abandoned.

(51) Int. Cl.
*H04N 5/225* (2006.01)
*H02N 15/00* (2006.01)

(52) U.S. Cl.
CPC ........... *H04N 5/2252* (2013.01); *H02N 15/00* (2013.01); *H04N 5/2258* (2013.01)

(58) Field of Classification Search
CPC .. H04N 5/2252; H04N 5/2258; H04N 5/2259; H02N 15/00
See application file for complete search history.

(56) References Cited

U.S. PATENT DOCUMENTS

| | | | |
|---|---|---|---|
| 9,795,894 | B2 | 10/2017 | Chieffo |
| 10,623,695 | B1 | 4/2020 | Prasannavenkatesan |
| 2007/0285496 | A1 | 12/2007 | Leva |
| 2016/0064989 | A1 | 3/2016 | Lv |
| 2020/0279682 | A1 | 9/2020 | Thomas |

FOREIGN PATENT DOCUMENTS

| | | |
|---|---|---|
| CN | 204180188 U | 2/2015 |
| CN | 204967972 U | 1/2016 |
| CN | 105450981 A | 3/2016 |

(Continued)

*Primary Examiner* — John Villecco
(74) *Attorney, Agent, or Firm* — NZ Carr Law Office PLLC

(57) ABSTRACT

A magnetic levitation camera apparatus and its operation are disclosed. The magnetic levitation camera apparatus comprises a base module and a camera module. The base module includes a base casing and a first magnetic component. The camera module includes a camera casing separate from the base casing, a camera communication unit, a second magnetic component, and at least one camera device. One of the first magnetic component and the second magnetic component is electrified to repel the other one of the first magnetic component and the second magnetic component, so that the camera module is magnetically levitated from the base module. The camera communication unit is configured to communicate with at least one of an external router and a data storage server, and the captured information is transmitted via the external router to a remote electronic device or to the data storage server.

16 Claims, 8 Drawing Sheets

(56) References Cited

FOREIGN PATENT DOCUMENTS

| | | | |
|---|---|---|---|
| CN | 205071146 U | 3/2016 | |
| CN | 105744128 A | 7/2016 | |
| CN | 105867702 A | 8/2016 | |
| CN | 106941584 A | 7/2017 | |
| CN | 206332750 U | 7/2017 | |
| CN | 107024881 A | 8/2017 | |
| CN | 206422839 U | 8/2017 | |
| CN | 207099173 U | 3/2018 | |
| CN | 108183633 A | 6/2018 | |
| CN | 105323445 B | 8/2018 | |
| CN | 211606602 U | 9/2020 | |
| CN | 113126658 A * | 7/2021 | ............... G05D 3/12 |
| CN | 214125396 U * | 9/2021 | |
| KR | 10-2006-0058902 | 6/2006 | |
| KR | 10-1698866 B1 | 1/2017 | |
| WO | 2010/075737 A1 | 7/2010 | |
| WO | WO-2017034205 A1 * | 3/2017 | ............... H02J 17/00 |
| WO | 2018/163037 A1 | 9/2018 | |

\* cited by examiner

MAGNETIC LEVITATION CAMERA APPARATUS AND LIVE VIDEO SYSTEM THEREWITH

CROSS REFERENCE TO RELATED APPLICATIONS

This application is a continuation-in-part of U.S. application Ser. No. 16/617,492, filed on Nov. 26, 2019, and is incorporated herein by reference.

BACKGROUND OF THE INVENTION

1. Field of the Invention

The present invention relates to a camera apparatus, and more particularly, to a magnetic levitation camera apparatus and a live video system therewith.

2. Description of the Prior Art

A traditional camera or camcorder apparatus used for image and/or audio/video capture is typically powered by bulky batteries or thick power cables, and may sometimes be set above mounting stands. Such setup limits the movement of the apparatus and also reduces the operator's freedom in positioning said apparatus. As energy-storage technologies evolve to reduce battery sizes and phase out thick power cables, said apparatus have become smaller in size and lighter in weight, making them easier to operate. However, they may still be fixed to mounting stands and cannot move freely. Cameras being fixed to mounting stands also increase their overall visual size, making them physically and visually unattractive. To indicate their operational status, the cameras usually use blinking lights and/or visual prompts on their display screens to suggest data transmission and/or recording. However, blinking lights may not be clearly visible from a distance.

Webcams are cameras connected to a computer that enables the user to transmit the captured images or to stream audio/video information to a remote location. Such internet-enabled devices tend to have limited functionality, in that they typically transmit the information to be stored remotely and do not have local storage. Such cameras also typically consist of a single front-facing lens, allowing only audio/video information of objects directly in front of the camera body to be captured. In such configuration, all objects to be captured would need to be placed in front of the camera, leading to yet again limited placement or positioning of the camera apparatus.

SUMMARY OF THE INVENTION

The present invention provides a magnetic levitation camera apparatus and a live video system therewith for solving above drawbacks.

According to one aspect of the present invention, a magnetic levitation camera apparatus comprises a base module and a camera module. The base module comprises a base casing and a first magnetic component mounted with the base casing. The camera module comprises a camera casing separate from the base casing, a camera device mounted with the camera casing and configured to capture images or record videos, and a second magnetic component mounted with the camera casing. One of the first magnetic component and the second magnetic component is electrified to repel the other one of the first magnetic component and the second magnetic component, so that the camera module is magnetically levitated from the base module.

Preferably, the first magnetic component is an electromagnetic coil module, and the base module further comprises a base circuit coupled to the electromagnetic coil module and configured to electrify the electromagnetic coil module.

Preferably, the base circuit comprises a base battery unit configured to supply power to the electromagnetic coil module and a power management unit configured to manage electricity of the base battery unit.

Preferably, the base module further comprises a base communication unit configured to establish communication with an external router, wherein the base circuit electrifies the electromagnetic coil module according to a command transmitted from the external router via the base communication unit.

Preferably, the second magnetic component is a magnet.

Preferably, the camera module further comprises a processor coupled to the camera device and configured to process the images or the videos captured by the camera device, and a camera communication unit configured to establish communication with at least one of an external router and a data storage server; wherein the processor controls the camera device to capture the images or record the videos according to a command transmitted from the external router via the camera communication unit; wherein the processor transmits the images or the videos to the data storage server via the camera communication unit.

Preferably, the processor processes the images or the videos, so as to determine whether an object shown in the images or the videos is a human character or not. The processor can further determine the number of human characters shown in the images or the videos, and/or can further determine whether an object shown in the images or the videos is moving; wherein the processor controls the camera communication unit to transmit a processing result of the images or the videos to the remote electronic device via the external router.

Preferably, the camera module further comprises a data storage coupled to the processor and configured to store the images or the videos, an inertia measurement unit configured to measure inertia of the camera module when the camera module is magnetically levitated from the base module, a power supply unit configured to supply power to the camera module, an audio unit coupled to the processor and configured to receive sounds, and an image display unit configured to display a user interface.

Preferably, the base casing comprises a top housing configured to support the camera module, a bottom housing containing the first magnetic component cooperatively with the top housing, a plurality of cushion pads disposed on the top housing and configured to abut against the camera module, and a contact pad disposed on the top housing; wherein the contact pad electrifies the camera module when the top housing supports the camera module.

Preferably, the camera casing comprises an upper housing and a lower housing; the lower housing contains the camera device and the second magnetic component cooperatively with the upper housing.

Preferably, the camera device is a panoramic camera or a binocular camera.

According to another aspect of the present invention, a live video system comprises a remote electronic device with an application software imbedded therein; an external router; and a magnetic levitation camera apparatus. The magnetic levitation camera apparatus comprises a base module having a first magnetic component and a camera module that has a camera device and a second magnetic component. The application software of the remote electronic device is operable to transmit a command to the camera module and the base module via the external router; the camera device of the camera module is turned on for capturing images or recording videos based on the command; and one of the first magnetic component and the second magnetic component is electrified to repel the other one of the first magnetic component and the second magnetic component based on the command, so that the camera module is magnetically levitated from the base module.

Preferably, the camera module of the live video system further comprises a processor and a camera communication unit, and the processor controls the camera communication unit to transmit the images or the videos to the remote electronic device via the external router. The camera module further comprises an image display unit, the camera communication unit receives information from the remote electronic device via the external router, and the processor controls the image display unit to display the information. The camera module further comprises a processor and a data storage, and the processor stores the images or the videos captured by the camera device in the data storage.

Preferably, the camera device of the live video system is a panoramic camera or a binocular camera.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
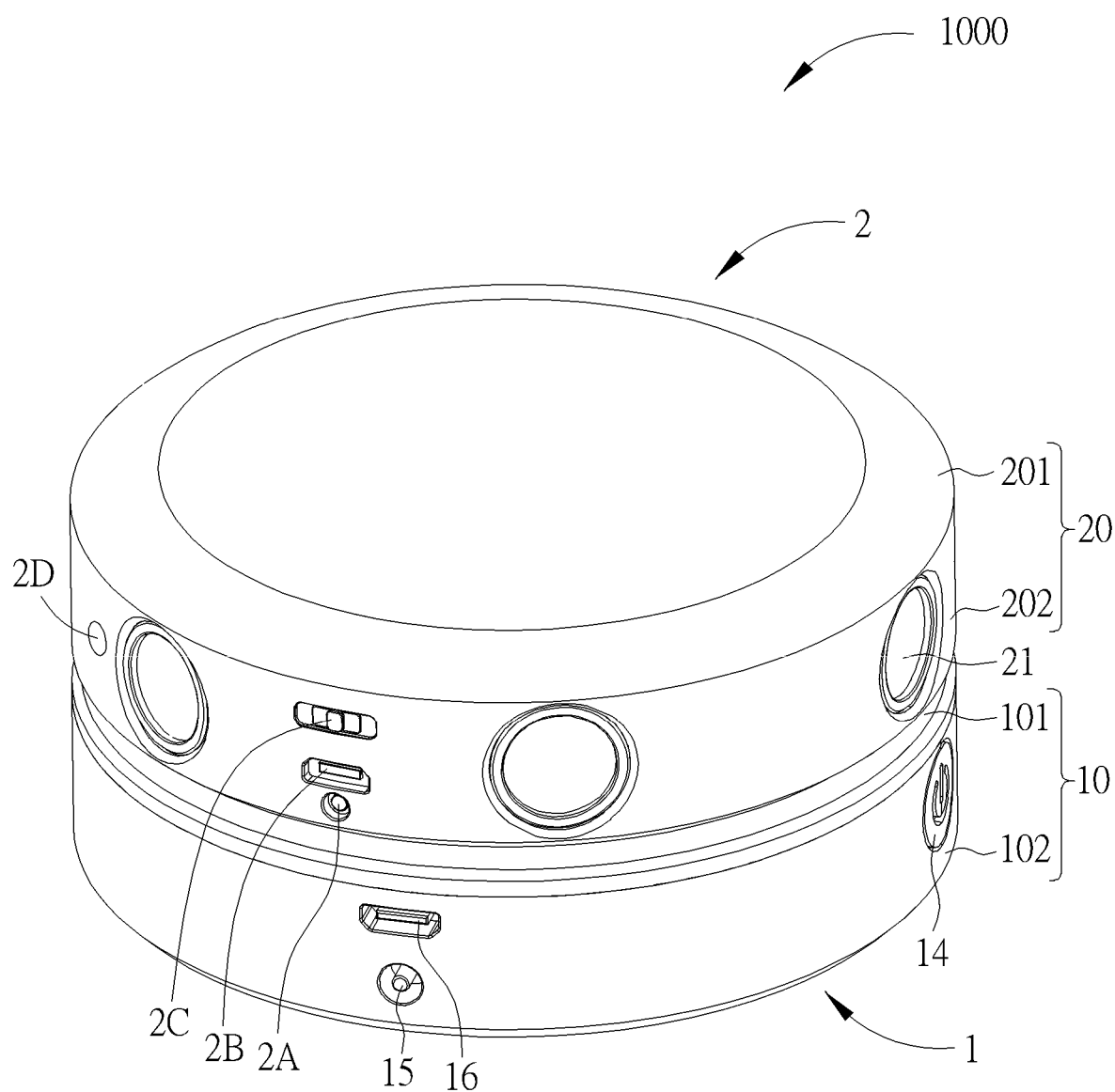
FIG. 1 is a schematic diagram illustrating a magnetic levitation camera apparatus in a docked status according to an embodiment of the present invention.
Figure 2:
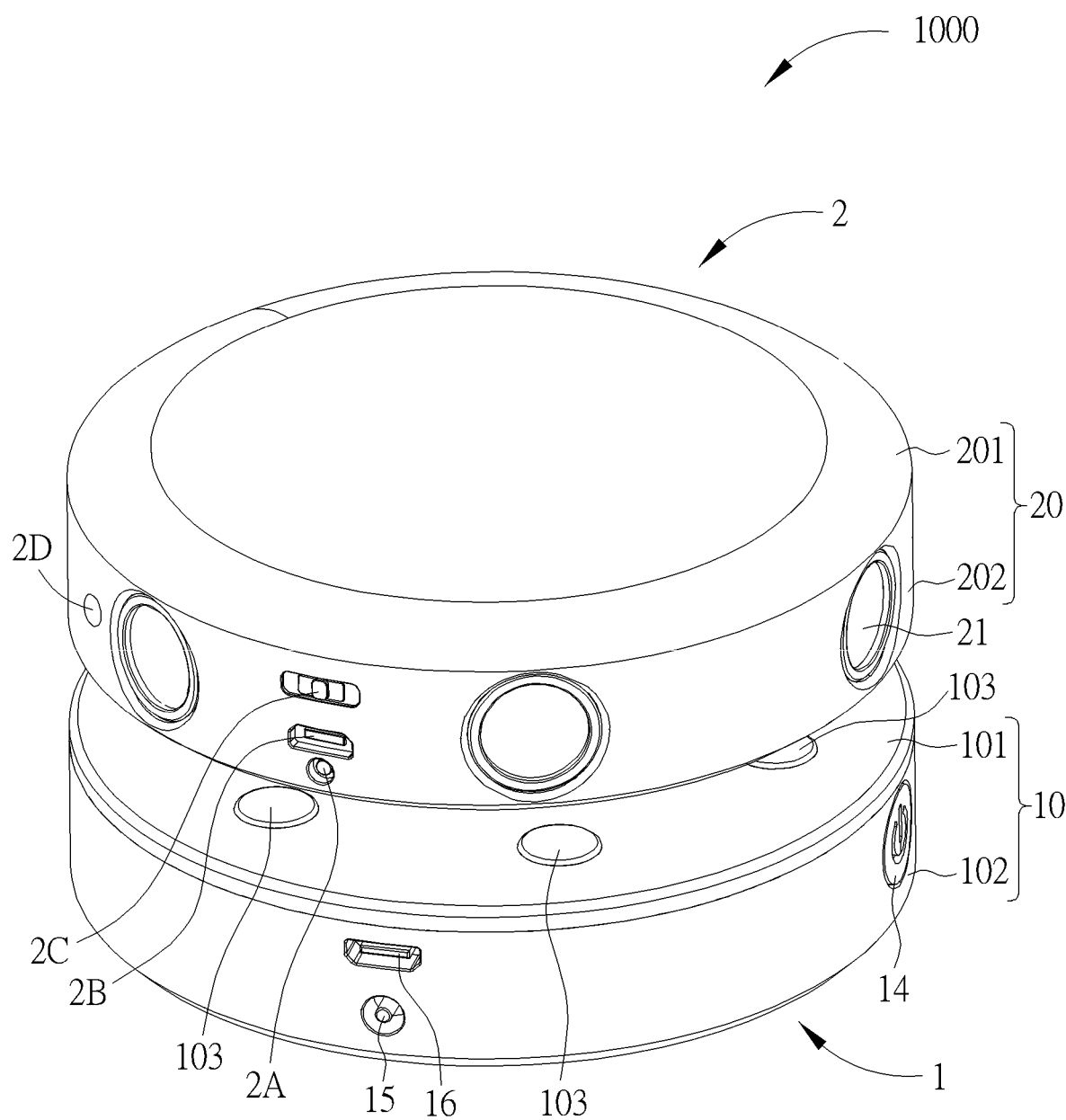
FIG. 2 is a schematic diagram illustrating the magnetic levitation camera apparatus in a levitating status according to the embodiment of the present invention.
Figure 3:
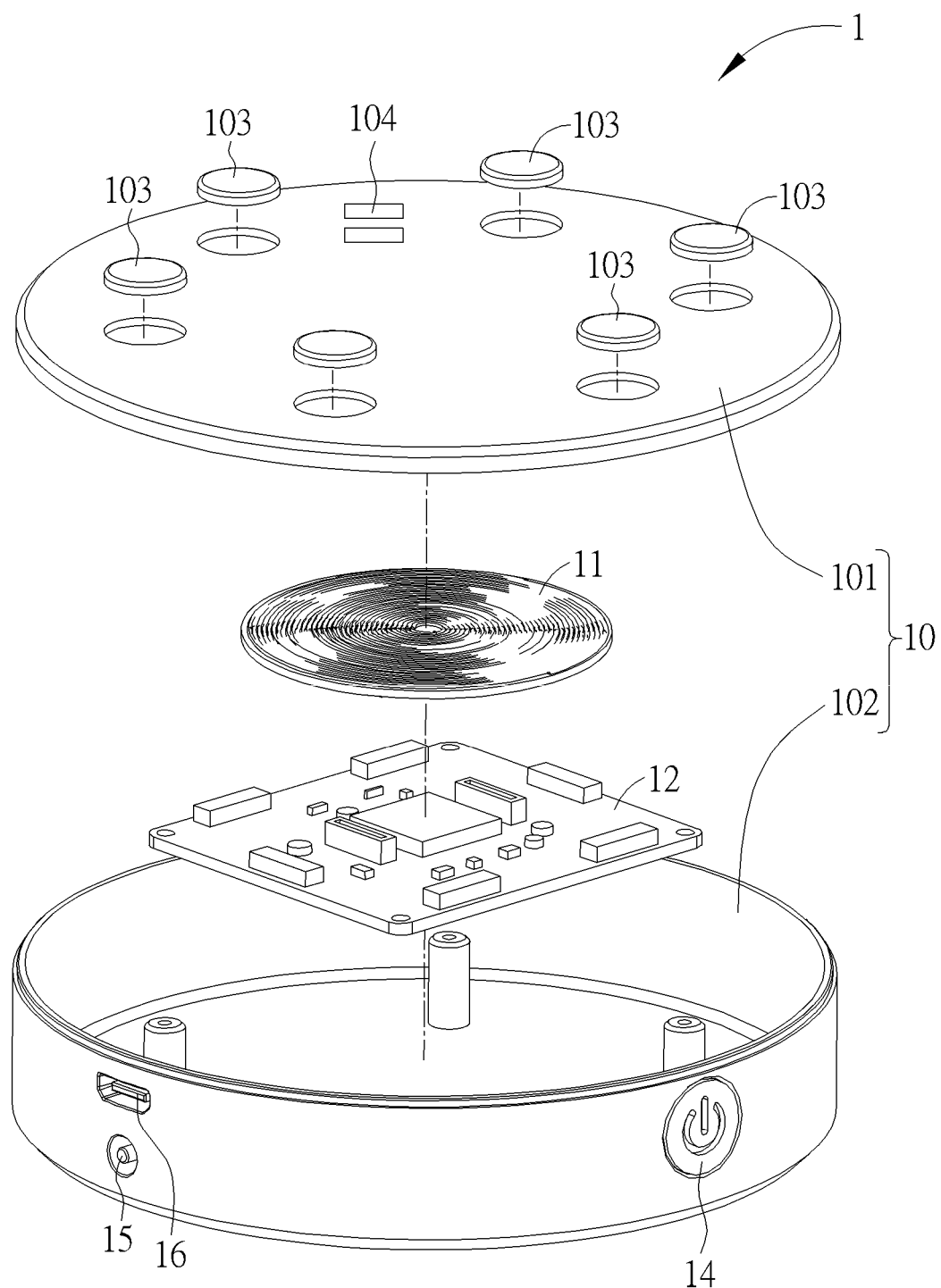
FIG. 3 is an exploded diagram illustrating a base module according to the embodiment of the present invention.
Figure 4:
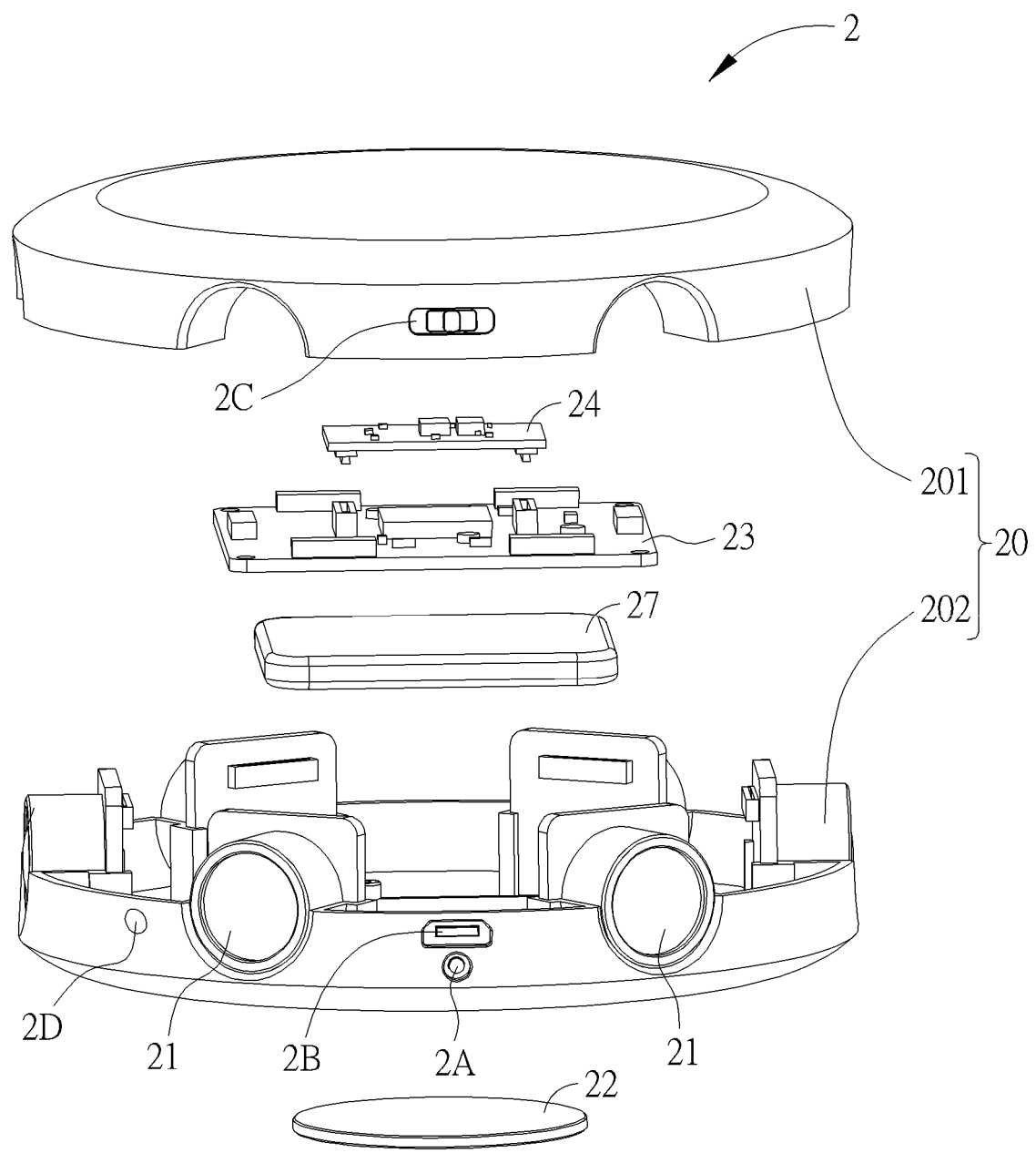
FIG. 4 is an exploded diagram illustrating a camera module according to the embodiment of the present invention.
Figure 5:
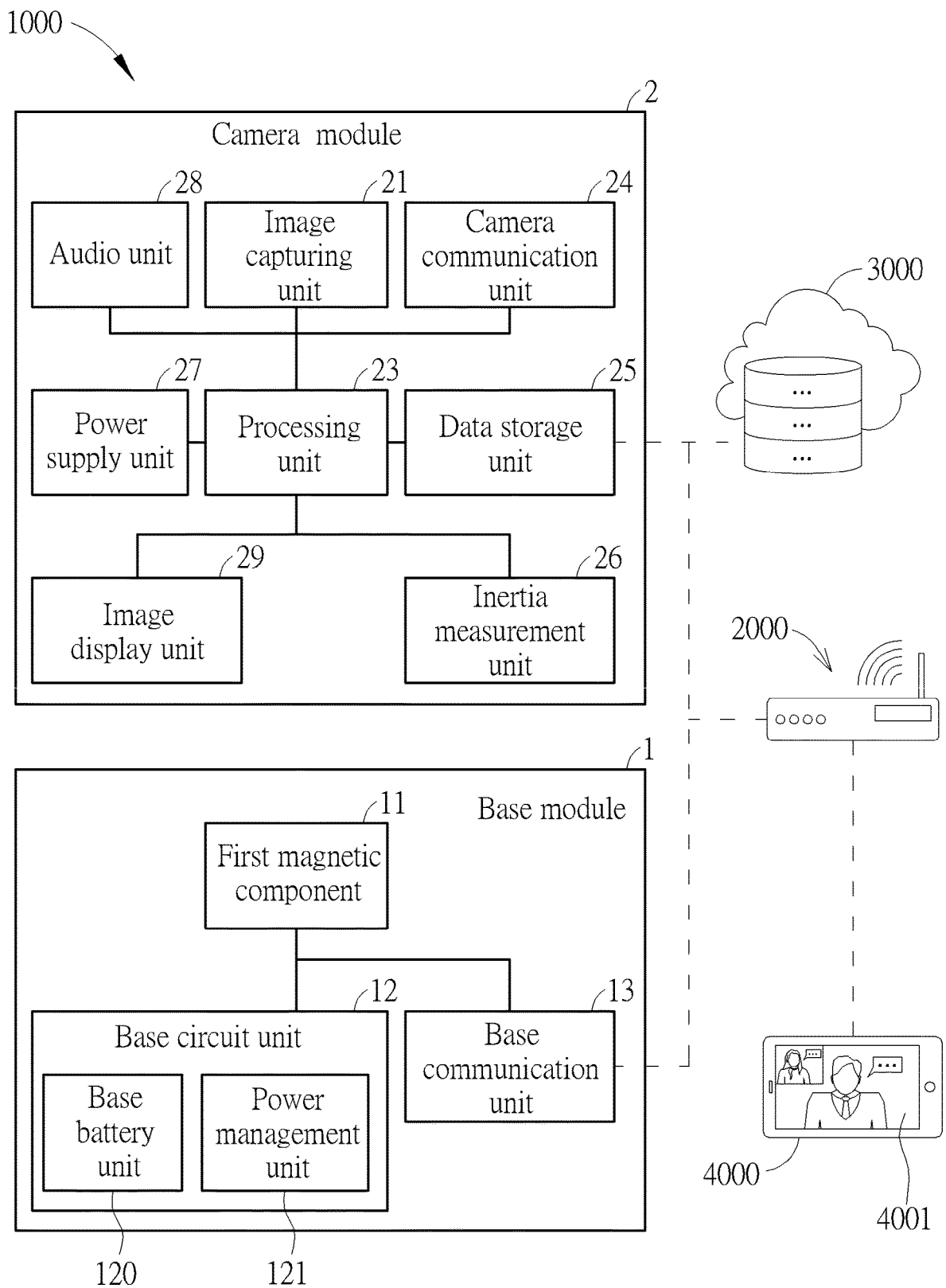
FIG. 5 is a functional block diagram of a live video system according to the embodiment of the present invention.

Please refer to FIGS. 1-5. FIG. 1 is a schematic diagram illustrating a magnetic levitation camera apparatus 1000 in a docked status according to an embodiment of the present invention. FIG. 2 is a schematic diagram illustrating the magnetic levitation camera apparatus 1000 in a levitating status according to the embodiment of the present invention. FIG. 3 is an exploded diagram illustrating a base module 1 according to the embodiment of the present invention. FIG. 4 is an exploded diagram illustrating a camera module 2 according to the embodiment of the present invention. FIG. 5 is a functional block diagram of a live video system illustrating a functional relationship between the magnetic levitation camera apparatus 1000, an external router 2000, a data storage server 3000, and a remote electronic device 4000.

As shown in FIGS. 1-5, an embodiment of the present invention comprises a magnetic levitation camera apparatus 1000. The magnetic levitation camera apparatus 1000 comprises a base module 1 and a camera module 2. The base module 1 comprises a base casing 10 and a first magnetic component 11. In this embodiment, the base casing 10 includes a top housing 101 and a bottom housing 102, wherein the top housing 101 is configured to support the camera module 2. A contact pad 104 and a plurality of cushion pads 103 are disposed on the top housing 101, and the cushion pads 103 are configured to abut against the camera module 2. The bottom housing 102 contains the first magnetic component 11 cooperatively with the top housing 101, so that the first magnetic component 11 is mounted with the base casing 10.

The base module 1 further comprises a base circuit 12 coupled to the first magnetic component 11 (i.e., the electromagnetic coil module) and a base communication unit 13 configured to establish communication with the external router 2000. The base circuit 12 comprises a base battery unit 120 configured to supply power to the electromagnetic coil module, and a power management unit 121 configured to manage electricity of the base battery unit 120. In one embodiment of the present invention, the base circuit 12 can be a circuit board (such as a printed circuit board (PCB) or a PCB assembly (PCBA)), an integrated circuit, a chip, etc., and the present invention is not limited thereto.

The camera module 2 comprises a camera casing 20, at least one camera device 21 and a second magnetic component 22. The camera casing 20 is separate from the base casing 10, and includes an upper housing 201 and a lower housing 202. The at least one camera device 21 is mounted with the camera casing 20 and configured to capture images or record audio/video information. In this embodiment, the camera module 2 is equipped with a plurality of camera devices 21, and the camera devices 21 are preferably mounted along the perimeter of the camera casing 20. An amount of the camera device 21 is not limited thereto. For example, the camera module 2 can be equipped with only one camera device 21 for reducing the weight of the camera module 2 thereof. In other words, structures such as the camera module 2 that are equipped with at least one camera device 21 are within the scope of the present invention.

Furthermore, the lower housing 202 contains the second magnetic component 22 cooperatively with the upper housing 201. In this embodiment, the first magnetic component 11 is an electromagnetic coil module, and the second magnetic component 22 is a magnet, but the present invention is not limited thereto. For example, the first magnetic component 11 can be a magnet, and the second magnetic component 22 can be an electromagnetic coil module; i.e., structures with one of the first magnetic component 11 and the second magnetic component 22 being an electromagnetic coil module and the other one of the first magnetic component 11 and the second magnetic component 22 being a magnet are with the scope of the present invention.

The camera module 2 further comprises a processor 23, a camera communication unit 24, a data storage 25, an inertia measurement unit 26, a power supply unit 27, an audio unit 28 and an image display unit 29. In one embodiment, the inertia measurement unit 26 is a gyroscope or the like; the processor 23 is a central processing unit (CPU), a graphics processing unit (GPU), etc.; and the data storage is a random access memory (RAM), a read-only memory (ROM), a computer memory, a hard drive, etc., but the present invention is not limited thereto. Preferably, a camera DC power input 2A, a camera USB data port 2B, a camera function switch 2C and a microphone 2D are configured on the camera casing 20. In one embodiment of the present invention, the camera function switch 2C is configured on the upper housing 201 of the camera casing 20, and the camera DC power input 2A along with the camera USB data port 2B and the microphone 2D are configured on the lower housing 202 of the camera casing 20.

One of the first magnetic component 11 and the second magnetic component 22 is electrified to repel the other one of the first magnetic component 11 and the second magnetic component 22, so that the camera module 2 is magnetically levitated from the base module 1. In this embodiment, the base circuit 12 electrifies the first magnetic component 11 according to a command transmitted from the external router 2000 via the base communication unit 13. The at least one of the cushion pads 103 disposed on the top housing 101 reduce the possibility of the camera module 2 being damaged when the camera module 2 returns from a levitating status (an example is shown in FIG. 2) to a docked status (an example is shown in FIG. 1). The contact pad 104 electrifies the camera module 2 to charge the power supply unit 27 when the top housing 101 supports the camera module 2. The base power switch 14 turns on/off the base module, the base DC power input 15 provides power to the base circuit 12, and the base USB data port 16 is coupled with the base communication unit 13 for communication between the base communication unit 13 and the external router 2000.

The camera communication unit 24 is configured to establish communication with at least one of the external router 2000 and the data storage server 3000. The processor 23 controls the camera device 21 to capture and process images or record videos according to a command transmitted from the external router 2000 via the camera communication unit 24. The processor 23 also transmits the images or the videos to the data storage server 3000 via the camera communication unit 24. The data storage 25 is coupled to the processor 23 and configured to store the images or the videos captured by the camera device 21. The inertia measurement unit 26 is configured to measure inertia of the camera module 2 when the camera module 2 is magnetically levitated from the base module 1. The power supply unit 27 is configured to supply power to the camera module 2. The audio unit 28 is coupled to the processor 23 and configured to receive sound via the microphone 2D. The image display unit 29 is configured to display a user interface. The camera function switch 2C is used to switch the functions of the camera device 21, the camera power input 2A provides power to the camera module 2, and the base USB data port 2B is coupled with the processor 23 for communication between the camera module 2 and the external router 2000 or the data storage server 3000.

It is worth mentioning that, in one embodiment, the base communication unit 13 and the camera communication unit 24 can each be a WI-FI® communication unit, a BLUETOOTH® communication unit, a Zigbee communication unit, a LoRa communication unit, a Sigfox communication unit, an NB-IoT communication unit, etc., and the present invention is not limited thereto. In other words, as long as being capable of transmitting signals (e.g., commands) among the components of the magnetic levitation camera apparatus 1000, the base communication unit 13 and the camera communication unit 24 can be any kind of signal transceiver that are capable of transmitting or receiving the signals for WI-FI®, BLUETOOTH®, Zigbee, LoRa, Sigfox, or NB-IoT communications, and the present invention is not limited thereto.

According to an embodiment of the present invention, the camera device 21 is camera, a recorder, etc., and the present invention is not limited thereto. For example, the camera device 21 is a panoramic camera that allows wide-angle images and/or videos to be captured, or a binocular camera/stereo camera that allows images and/or videos with depth-of-field information to be captured.

According to another embodiment of the present invention, a live video system comprises the remote electronic device 4000 with an application software 4001 imbedded therein; the external router 2000; and the magnetic levitation camera apparatus 1000 with components, structures and functions identical to those described in the aforesaid embodiments. Further description is omitted herein for simplicity. The application software 4001 of the remote electronic device 4000 (such as tablet computers, smart phones, the types of devices not limited to those mentioned herein) of the live video system is operable to transmit a command to the camera module 2 and the base module 1 via the external router 2000, wherein the camera device 21 of the camera module 2 is turned on for capturing images or recording videos based on the command, and one of the first magnetic component 11 and the second magnetic component 22 is electrified to repel the other one of the first magnetic component 11 and the second magnetic component 22 based on the command, so that the camera module 2 is magnetically levitated from the base module 1. The camera module 2 further comprises the processor 23 that controls the camera communication unit 24 to transmit the images or the videos to the remote electronic device 4000 via the external router 2000, an image display unit 29 that receives information from the remote electronic device 4000 via the external router 2000, and the data storage 25. The processor 23 controls the image display unit 29 to display said information. The processor 23 also controls the camera communication unit 24 to transmit the images or the videos to the remote electronic device 4000 or the data storage server 3000 via the camera communication unit 24. The data storage 25 is configured to store the images or the videos captured by the camera device 21.

Figure 6:
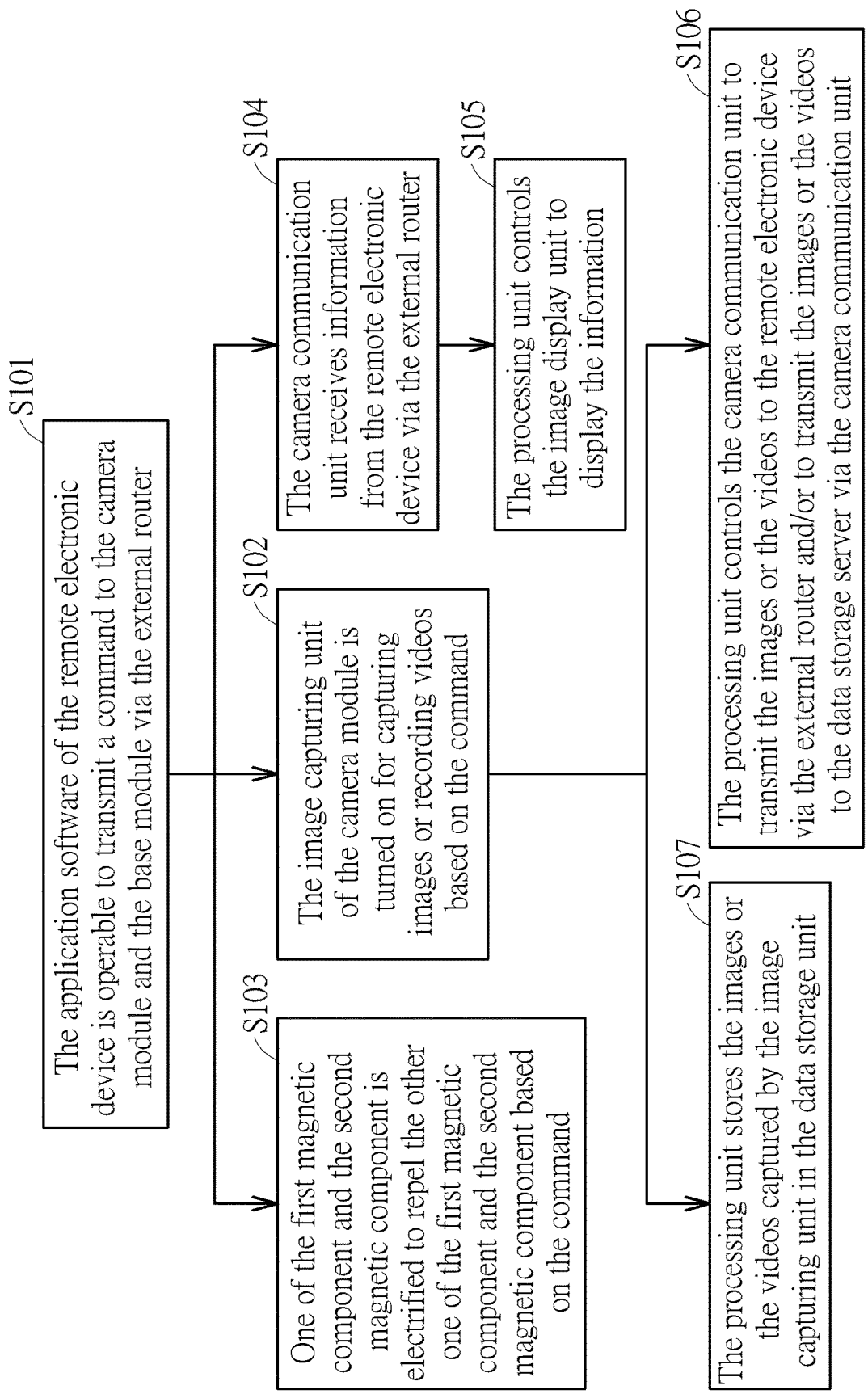
FIG. 6 is a flow chart illustrating the steps to operate the magnetic levitation camera apparatus according to the embodiment of the present invention.

Please refer to FIG. 6, a flow chart illustrating the steps to operate the magnetic levitation camera apparatus 1000 after a user of the remote electronic device 4000 inputs a command to the remote electronic device 4000. A method to operate the magnetic levitation camera apparatus 1000 according to the embodiment of the present invention includes the steps of:

Step S101: The application software 4001 of the remote electronic device 4000 is operable to transmit a command to the camera module 2 and the base module 1 via the external router 2000;

Step S102: The camera device 21 of the camera module 2 is turned on for capturing images or recording videos based on the command;

Step S103: One of the first magnetic component 11 and the second magnetic component 22 is electrified to repel the other one of the first magnetic component 11 and the second magnetic component 22 based on the command;

Step S104: The camera communication unit 24 receives information from the remote electronic device 4000 via the external router 2000;

Step S105: The processor 23 controls the image display unit 29 to display the information;

Step S106: The processor 23 controls the camera communication unit 24 to transmit the images or the videos to the remote electronic device 4000 via the external router 2000, and/or to transmit the images or the videos to the data storage server 3000 via the camera communication unit 24;

Step S107: the processor 23 stores the images or the videos captured by the camera device 21 in the data storage 25.

In one embodiment of the present invention, the application software 4001 of the remote electronic device 4000 is operated to transmit a command, wherein the command is submitted to the external router 2000 that in turn transmits the command to the camera module 2 and the base module 1 (step S01). Subsequently, the camera device 21 of the camera module 2 is turned on for capturing images or recording videos based on the command (step S102); meanwhile, one of the first magnetic component 11 and the second magnetic component 22 is electrified to repel the other one of the first magnetic component 11 and the second magnetic component 22 based on the command, thereby levitating the camera module 2 from the base module 1 (step S103); at the same time, the camera communication unit 24 receives information from the remote electronic device 4000 via the external router 2000 (step S104).

Upon completion of step S102, the processor 23 controls the camera communication unit 24 to transmit the captured images or the captured videos to the remote electronic device 4000 via the external router 2000, and/or to transmit the images or the videos to the data storage server 3000 via the camera communication unit 24 (step S106); simultaneously, the processor 23 stores the images or the videos captured by the camera device 21 in the data storage 25 (step S107).

In another embodiment of the present invention, the processor 23 processes the captured images or the videos to determine whether an object shown in the images or the videos is a human character or not. The processor 23 can further determine the number of human characters shown in the images or the videos, and/or can further determine whether an object shown in the images or the videos is moving. The processor 23 then controls the camera communication unit 24 to transmit a processing result of the images or the videos (e.g., a result on the number of human characters determined from the images or the videos, or a result of whether the characters in the images or the videos are moving) to the remote electronic device 4000 via the external router 2000, the transfer of processing results being an alternative to step S106 shown in FIG. 6.

Figure 7:
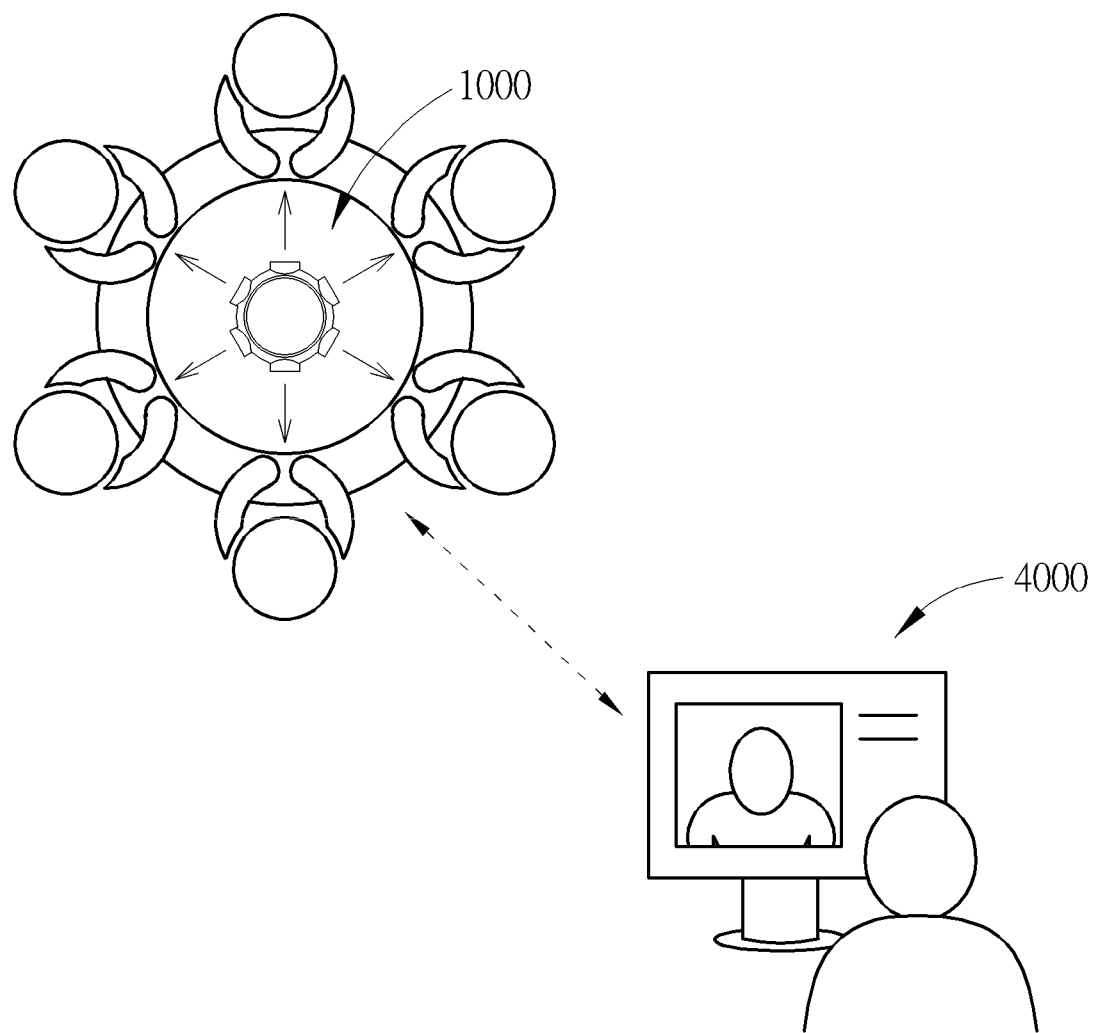
FIG. 7 is a diagram illustrating a scenario, in which a link between the magnetic levitation camera apparatus and the remote electronic device is established during an application of the magnetic levitation camera apparatus according to the embodiment of the present invention.

Please refer to FIG. 7, a diagram illustrating a scenario, in which a link between the magnetic levitation camera apparatus 1000 and the remote electronic device 4000 is established.

In one embodiment of the present invention, the magnetic levitation camera apparatus 1000 is operated during a meeting or a conference call, but an application of the present invention is not limited thereto. When the application software 4001 of the remote electronic device 4000 is operable to transmit a command to the magnetic levitation camera apparatus 1000, a link between the magnetic levitation camera apparatus 1000 and the remote electronic device 4000 is established. The camera module 2 levitates from the base module 1 to indicate that remote users are ready to participate in the meeting or the conference call. The images or videos captured by the camera device 21 are transmitted to the remote electronic device 4000 via the external router 2000 for viewing on the remote electronic device 4000. Conversely, when remote users leave the meeting or the conference call, the application software 4001 is operable to transmit another command to the magnetic levitation camera apparatus 1000 terminating the link between the magnetic levitation camera apparatus 1000 and the remote electronic device 4000, stops the transmission of the captured images or videos, and subsequently docking the camera module 2. Therefore, the presence of remote users during the meeting or conference call is suggested by the status (levitating or non-levitating) of the camera module 2.

Additionally, the camera devices 21 are configured in a 360-degree arrangement surrounding the perimeter of the camera module 2. This allows images and/or videos surrounding the entirety of the camera module 2 to be captured while reducing blind spots in the captured images and/or videos; configuring the camera module 2 with a panoramic camera can further reduce said blind spots.

Figure 8:
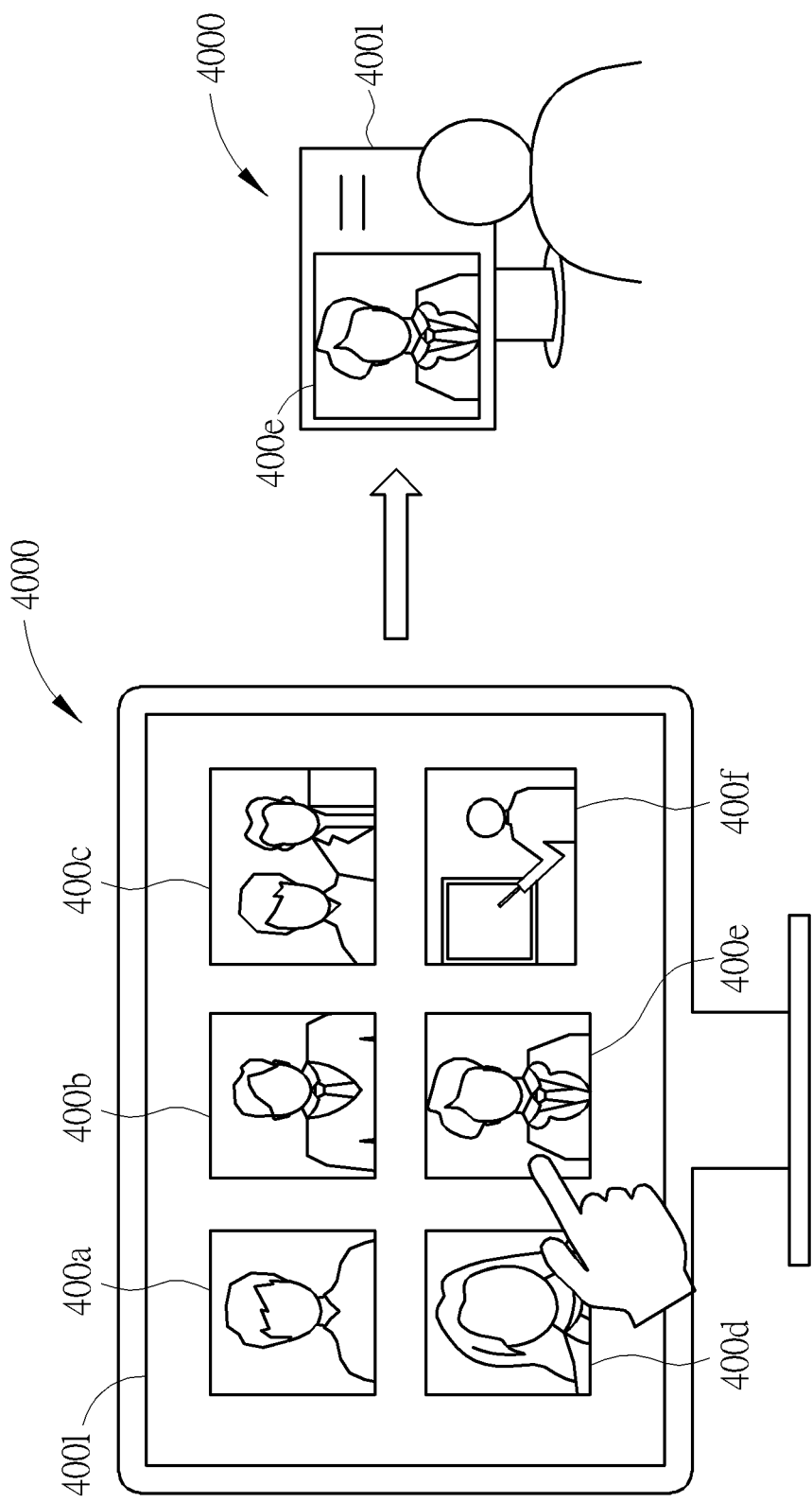
FIG. 8 is a diagram illustrating an application software being capable of changing the information displayed on the software from one with multiple view windows to one with a single view window according to the embodiment of the present invention.

Please refer to FIG. 8, a diagram illustrating the application software 4001 being capable of changing the information displayed on the application software 4001 from one with multiple view windows to one with a single view window.

In one embodiment of the present invention, the magnetic levitation camera apparatus 1000 is mounted with a plurality of camera devices 21 capable of capturing multiple images and/or videos simultaneously. The application software 4001 on the remote electronic device 4000 can be configured to display multiple images and/or videos that are captured by their respective camera devices 21 in multiple view windows (400*a*, 400*b*, 400*c*, 400*d*, 400*e*, 400*f*). The application software 4001 can alternately be configured to display single images and/or videos in a single view window (400*e*).

In one embodiment of the present invention, the images and/or videos captured by the camera devices 21 are transmitted in real-time (streamed) to the remote electronic device 4000. Remote users can select a single view window to be displayed in the application software 4001, so as to avoid a delay in data transmission, as transmitting images and/or video from multiple camera devices 21 may increase the burden on data servers and reduce the quality of the transmitted images and/or videos.

It can be seen from the aforementioned embodiments that the present invention includes the following advantages:

1. The magnetic levitation camera apparatus 1000 comprises a base module 1 that includes a first magnetic component 11 and a camera module 2 that includes a plurality of camera devices 21 along with a second magnetic component 22. One of the first magnetic component 11 and the second magnetic component 22 is electrified to repel the other one of the first magnetic component 11 and the second magnetic component 22, so that the camera module 2 is magnetically levitated from the base module 1. The status of the camera module 2 (levitating or non-levitating) can suggest whether or not remote users are present during meetings or conference calls, whether or not data transmission is in progress, or whether the camera module 2 is recording. The levitating camera module 2 is an improvement in visual style over the blinking lights that may be difficult to observe in traditional cameras.

2. The magnetic levitation camera apparatus 1000 is configured to establish communication with an external router 2000 so that the images and/or videos captured by the camera device 21 can be stored in the data storage server 3000 or transmitted to the remote electronic device 4000.

3. The camera devices 21 are configured in a 360-degree arrangement surrounding the perimeter of the camera module 21. This allows images and/or videos surrounding the entirety of the camera module 2 to be captured while reducing blind spots in the captured images and/or videos; configuring the camera module 2 with a panoramic camera can further reduce said blind spots; configuring the camera module 2 with a binocular/stereo camera can provide depth-of-field information in the captured images and/or videos.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic levitation camera apparatus, comprising:
   a base module comprising:
      a base casing; and
      a first magnetic component mounted with the base casing;
   a camera module comprising:
      a camera casing separate from the base casing;
      a camera device mounted with the camera casing and configured to capture images or record videos;
      a second magnetic component mounted with the camera casing;
      a processor coupled to the camera device and configured to process the images or the videos captured by the camera device; and
      a camera communication unit;
   wherein one of the first magnetic component and the second magnetic component is electrified to repel the other one of the first magnetic component and the second magnetic component, so that the camera module is magnetically levitated from the base module;
   wherein when an application software of a remote electronic device is operable to transmit a command to the magnetic levitation camera apparatus to establish a link between the magnetic levitation camera apparatus and the remote electronic device through an external router, the camera module levitates from the base module through the first magnetic component and the second magnetic component to indicate that remote users are ready to participate in a meeting or a conference call through the link;
   wherein when the remote users leave the meeting or the conference call, the application software is operable to transmit another command to the magnetic levitation camera apparatus terminating the link between the magnetic levitation camera apparatus and the remote electronic device, stopping the transmission of the captured images or videos, and subsequently docking the camera module;
   wherein the processor controls the camera device to capture the images or record the videos according to the command transmitted from the external router via the camera communication unit;
   wherein the processor transmits the images or the videos to the data storage server via the camera communication unit.

2. The magnetic levitation camera apparatus of claim 1, wherein the base module further comprises:
   a base communication unit configured to establish communication with an external router;
   wherein a base circuit electrifies the electromagnetic coil module according to a command transmitted from the external router via the base communication unit.

3. The magnetic levitation camera apparatus of claim 1, wherein the camera module further comprises:
   the processor coupled to the camera device and the images or the videos captured by the camera device; and
   wherein the processor controls the camera device to capture the images or record the videos according to the command transmitted from the external router via the camera communication unit;
   wherein the processor processes the images or the videos, so as to determine whether an object shown in the images or the videos is a human character or not;
   wherein when the object shown in the images or the videos is the human character, the processor determines the number of human characters shown in the images or the videos;
   wherein the processor controls the camera communication unit to transmit a processing result of the images or the videos to the remote electronic device via the external router.

4. The magnetic levitation camera apparatus of claim 1, wherein the camera module further comprises:
   the processor coupled to the camera device and processes the images or the videos captured by the camera device; and
   wherein the processor controls the camera device to capture the images or record the videos according to the command transmitted from the external router via the camera communication unit;
   wherein the processor processes the images or the videos, so as to determine whether an object shown in the images or the videos is moving;

wherein the processor controls the camera communication unit to transmit a processing result of the images or the videos to the remote electronic device via the external router.

5. The magnetic levitation camera apparatus of claim 1, wherein the camera module further comprises:
a data storage coupled to the processor and stores the images or the videos captured by the camera device.

6. The magnetic levitation camera apparatus of claim 1, wherein the camera module further comprises:
an inertia measurement unit measures inertia of the camera module when the camera module is magnetically levitated from the base module.

7. The magnetic levitation camera apparatus of claim 1, wherein the base casing comprises:
a top housing configured to support the camera module; and
a bottom housing containing the first magnetic component cooperatively with the top housing.

8. The magnetic levitation camera apparatus of claim 7, wherein the base casing further comprises:
a plurality of cushion pads disposed on the top housing and configured to abut against the camera module.

9. The magnetic levitation camera apparatus of claim 7, wherein the base casing further comprises:
a contact pad disposed on the top housing;
wherein the contact pad electrifies the camera module when the top housing supports the camera module.

10. The magnetic levitation camera apparatus of claim 1, wherein the camera casing comprises:
an upper housing; and
a lower housing containing the camera device and the second magnetic component cooperatively with the upper housing.

11. The magnetic levitation camera apparatus of claim 1, wherein the camera device is a panoramic camera or a binocular camera.

12. A live video system, comprising:
a remote electronic device with an application software imbedded therein;
an external router; and
a magnetic levitation camera apparatus, comprising:
a base module having a first magnetic component; and
a camera module having a camera device, a second magnetic component, a processor, and a camera communication unit, the processor controlling the camera communication unit to transmit the images or the videos captured by the camera device to the remote electronic device via the external router;
wherein the application software of the remote electronic device is operable to transmit a command to the camera module and the base module via the external router;
wherein one of the first magnetic component and the second magnetic component is electrified to repel the other one of the first magnetic component and the second magnetic component based on the command, so that the camera module is magnetically levitated from the base module;
wherein when the application software of the remote electronic device is operable to transmit the command to the magnetic levitation camera apparatus to establish a link between the magnetic levitation camera apparatus and the remote electronic device through the external router, the camera module levitates from the base module through the first magnetic component and the second magnetic component to indicate that remote users are ready to participate in a meeting or a conference call through the link;
wherein when the remote users leave the meeting or the conference call, the application software is operable to transmit another command to the magnetic levitation camera apparatus terminating the link between the magnetic levitation camera apparatus and the remote electronic device, stopping the transmission of the captured images or videos, and subsequently docking the camera module.

13. The live video system of claim 12, wherein the processor processes the images or the videos captured by the camera device, so as to determine whether an object shown in the images or the videos is a human character or not, when the object shown in the images or the videos is the human character, the processor determines the number of human characters shown in the images or the videos, and the processor controls the camera communication unit to transmit a processing result of the images or the videos to the remote electronic device via the external router.

14. The live video system of claim 12, the processor processes the images or the videos captured by the camera device, so as to determine whether an object shown in the images or the videos is moving, and the processor controls the camera communication unit to transmit a processing result of the images or the videos to the remote electronic device via the external router.

15. The live video system of claim 12, wherein the camera module further comprises an image display unit, the processor controls the image display unit to display information when the camera communication unit receives the information from the remote electronic device via the external router.

16. The live video system of claim 12, wherein the camera device is a panoramic camera or a binocular camera.

* * * * *